US009560324B2

(12) United States Patent
Monaghan, Sr. et al.

(10) Patent No.: US 9,560,324 B2
(45) Date of Patent: Jan. 31, 2017

(54) TACTICAL VISION SYSTEM

(75) Inventors: Andrew J. Monaghan, Sr., Castle Rock, CO (US); John Chambers, Zapata, TX (US); William Otero, Franktown, CO (US)

(73) Assignee: Drew Incorporated, Castle Rock, CO (US)

( * ) Notice: Subject to any disclaimer, the term of this patent is extended or adjusted under 35 U.S.C. 154(b) by 1006 days.

(21) Appl. No.: 13/023,654

(22) Filed: Feb. 9, 2011

(65) Prior Publication Data

US 2011/0261176 A1 Oct. 27, 2011

Related U.S. Application Data

(60) Provisional application No. 61/303,901, filed on Feb. 12, 2010.

(51) Int. Cl.
| | |
|---|---|
| *H04N 7/18* | (2006.01) |
| *G02B 27/01* | (2006.01) |
| *H04N 5/225* | (2006.01) |
| *H04N 5/232* | (2006.01) |

(52) U.S. Cl.
CPC ............ *H04N 7/183* (2013.01); *G02B 27/017* (2013.01); *H04N 5/2251* (2013.01); *H04N 5/23203* (2013.01); *G02B 2027/014* (2013.01); *G02B 2027/0138* (2013.01)

(58) Field of Classification Search
CPC ................. G02B 2027/0138; G02B 2027/014; G02B 27/017; H04N 5/2251; H04N 5/23203; H04N 7/183
See application file for complete search history.

(56) References Cited

U.S. PATENT DOCUMENTS

| | | | | | |
|---|---|---|---|---|---|
| 4,106,121 | A | * | 8/1978 | Belson | ............... A41D 13/0012 2/102 |
| 5,649,061 | A | * | 7/1997 | Smyth | ............................ 706/16 |
| 6,023,288 | A | | 2/2000 | Coombs et al. | |
| 6,091,546 | A | * | 7/2000 | Spitzer | .......................... 359/618 |
| 6,176,576 | B1 | * | 1/2001 | Green et al. | ................... 351/123 |
| 6,456,261 | B1 | * | 9/2002 | Zhang | ............................... 345/8 |
| 6,789,273 | B2 | * | 9/2004 | Markovitz | ......................... 2/436 |
| 6,977,671 | B1 | * | 12/2005 | Kitson | ................. H04N 1/2112 348/61 |
| 7,369,174 | B2 | | 5/2008 | Olita et al. | |
| 7,477,309 | B2 | * | 1/2009 | Cuccias | ......................... 348/342 |
| 8,791,600 | B2 | * | 7/2014 | Soar | ............................... 307/104 |
| 2003/0122958 | A1 | * | 7/2003 | Olita et al. | ..................... 348/373 |

(Continued)

OTHER PUBLICATIONS

International Search Report mailed Sep. 20, 2011 in PCT/US2011/024140, pp. 9.

*Primary Examiner* — Nhon Diep
(74) *Attorney, Agent, or Firm* — Locke Lord LLP

(57) ABSTRACT

A system comprising at least a wearable control unit, a camera apparatus and a wearable vision apparatus. The wearable control unit may receive information from the camera apparatus and may process the received camera information. For example, the received camera information may be thermal information or infrared information. The wearable control unit may process the received camera information to video information that may be transmitted to the wearable vision apparatus. The wearable vision apparatus may then display the received video information.

20 Claims, 10 Drawing Sheets

(56) References Cited

U.S. PATENT DOCUMENTS

2007/0182812 A1* 8/2007 Ritchey .......................... 348/36
2010/0303014 A1* 12/2010 McMullin ............. H04W 84/18
370/328

* cited by examiner

TACTICAL VISION SYSTEM

CLAIM TO PRIORITY

The present application claims priority to U.S. Provisional Patent Application Ser. No. 61/303,901, filed Feb. 12, 2010, the contents of which have been incorporated herein, in entirety, by reference.

BACKGROUND

1. Field of Invention

The present invention relates to vision systems, and in particular, to a wearable vision system that is configurable by a wearer to provide both enhanced vision by displaying video information derived from camera capture information and unobstructed normal vision.

2. Background

When engaged in dangerous situations, the safety of those involved may depend on maintaining uninterrupted concentration until these situations are resolved. Some situations may initially be deemed dangerous because of obvious hazards such as fire, natural forces such as bad weather, temperature, etc., hostile actions from human adversaries such as the exchange of gunfire, etc. However, readily apparent hazards often may lead to, and in some instances may distract from, other hazardous circumstances that can arise unexpectedly. Unforeseen collateral events can act as a catalyst to immediately exacerbate bad situations. Instantaneous reactions can avoid harm and save lives, and conversely, breaks in concentration can result in injury or even death for not only those directly involved in the situation, but also to innocent bystanders.

Handling dangerous situations is an everyday experience in some professions. In addition to the military, other examples may include civil servants such as policemen, firemen, search and rescue, border patrol officers, etc. These professionals are constantly put in jeopardy by the scenarios they face on a daily basis. The safety of these people, and possibly also of the teams in which they operate, may depend on each team member maintaining focus so that they may be able to react to both expected hazards and unexpected threats. Loss of focus may result in simple mistakes such as a person misjudging surrounding terrain. However, even a simple error can be costly. For example, the loss of formation due to personnel inadvertently tripping over a rock may result in a more serious situation such as the exposure of a military unit's flank to enemy fire, the need to rescue a fallen comrade from a condition that puts both the rescuer and the rescued in harm's way, unnecessary commotion that delays an urgent rescue operation, etc.

Even some tools that are meant to be beneficial in precarious situations can end up being dangerous distractions. For example, rescue equipment, if not able to be operated in a manner that allows focus to be maintained on the situation at hand, can create a loss of focus that places one or both of the operator and the person being rescued in jeopardy. For example, hand-held location or detection apparatuses may present issues because a person's hands are no longer free to hold more essential equipment. The same problem exists with equipment that requires a user to place focus on the apparatus itself during configuration. The requirement to move focus from the environment to the apparatus may subject the operator to peril in that they may not be aware of unforeseen circumstances that arise, and may not become aware of these circumstances until too late. Moreover, apparatuses that require users to physically reconfigure the object when not in use (e.g., so as not to be an obstruction) may prove to be more of a burden than a benefit.

SUMMARY

Various example embodiments of the present disclosure may be directed to a system, method and computer program product for a wearable vision system. For example, a system may comprise at least a wearable control unit, a camera apparatus and a wearable vision apparatus. The wearable control unit may receive information from the camera apparatus and may process the received camera information. For example, the received camera information may be thermal information or infrared information. The wearable control unit may process the received camera information to video information that may be transmitted to the wearable vision apparatus. The wearable vision apparatus may then display the received video information.

In at least one example implementation, the wearable control unit may interact with one or both of the camera apparatus and wearable vision apparatus via wired or short-range wireless communication (e.g., Bluetooth). The wearable control unit may further be integrated into other equipment that may be worn, such as incorporated in a tactical or bullet-proof vest, or may be implemented in a self-contained (e.g., modular) format that may be removably affixed to a user (e.g., wearer) during use. The wearable control unit may comprise at least a user interface by which a user may configure operation of the camera apparatus or wearable vision apparatus. For example, the user interface may be manipulated to activate the camera apparatus, control the sensitivity of the camera apparatus and control how the processed image information is displayed by the wearable vision apparatus. In at least one example configuration, the wearable control unit may also include a battery that may be removed from the wearable control unit for charging.

Example camera apparatuses usable in accordance with the various disclosed embodiments may capture non-visual information like thermal or infrared information. The information captured by the camera may then be transmitted to the wearable control unit for processing. Example camera apparatuses may further be permanently or removably affixed to eyewear (e.g., that may also incorporate the wearable vision apparatus) or to a helmet that may be worn during use of the vision system.

Example wearable vision apparatuses that may be employed in accordance with the various embodiments of the present disclosure may be configured with either a binocular or monocular video display. A binocular video display may display the video information received from the wearable control unit to both eyes of a user, while a wearable vision apparatus with a monocular display may be configured to display the video information to either the left or right eye of the user. The wearable vision apparatus may also be integrated into eyewear configured to allow the user to either see through the eyewear or to view video information displayed by the wearable vision apparatus without having to adjust the eyewear. In accordance with at least one embodiment of the present disclosure, the eyewear into which the wearable vision apparatus is integrated may be protective, such in the case of tactical eyewear, and may further comprise a communication subsystem including at least a microphone and earpiece. In at least one example implementation, the communication subsystem may also interact with the wearable control unit via wired communication or short-range wireless communication, and may also be controllable via the user interface in the wearable control unit.

The foregoing summary includes example embodiments of the system, method and computer product that are not intended to be limiting. The above embodiments are used merely to explain selected aspects or steps that may be utilized in implementations of the present disclosure. However, it is readily apparent that one or more aspects, or steps, pertaining to an example embodiment can be combined with one or more aspects, or steps, of other embodiments to create new embodiments still within the scope of the present disclosure. Therefore, persons of ordinary skill in the art would appreciate that various embodiments of the present disclosure may incorporate aspects from other embodiments, or may be implemented in combination with other embodiments.

DESCRIPTION OF DRAWINGS

The description of the various example embodiments is explained in conjunction with appended drawings, in which.

DESCRIPTION OF EXAMPLE EMBODIMENTS

While illustrative implementations of one or more embodiments of the present disclosure are provided below, various changes can be made therein without departing from the spirit and scope of the invention, as described in the appended claims.

In accordance with at least one embodiment of the present disclosure, a vision system may comprise at least a wearable control unit, a camera apparatus and a wearable vision apparatus that may be worn by a user (e.g., wearer). During operation, the wearable control unit may receive camera information from the camera apparatus, may process the camera information into video information, and may transmit the video information to the wearable vision apparatus. The wearable vision apparatus may then display the received video information to the wearer.

In discussing the various embodiments of the present disclosure, reference may be made to certain types of communication such as wired communication, wireless communication, short-range wireless communication, Bluetooth communication, etc. In addition, reference may also be made to various types of information such as thermal information, infrared information, video information, etc. The recitation of particular types of communication or information have been made simply for the sake of explanation herein, and are not intended as limits to the scope of the various embodiments of the present disclosure. As a result, the disclosed system, method and computer program product may be implemented with other types of communication or information not specifically identified herein.

Figure 1:
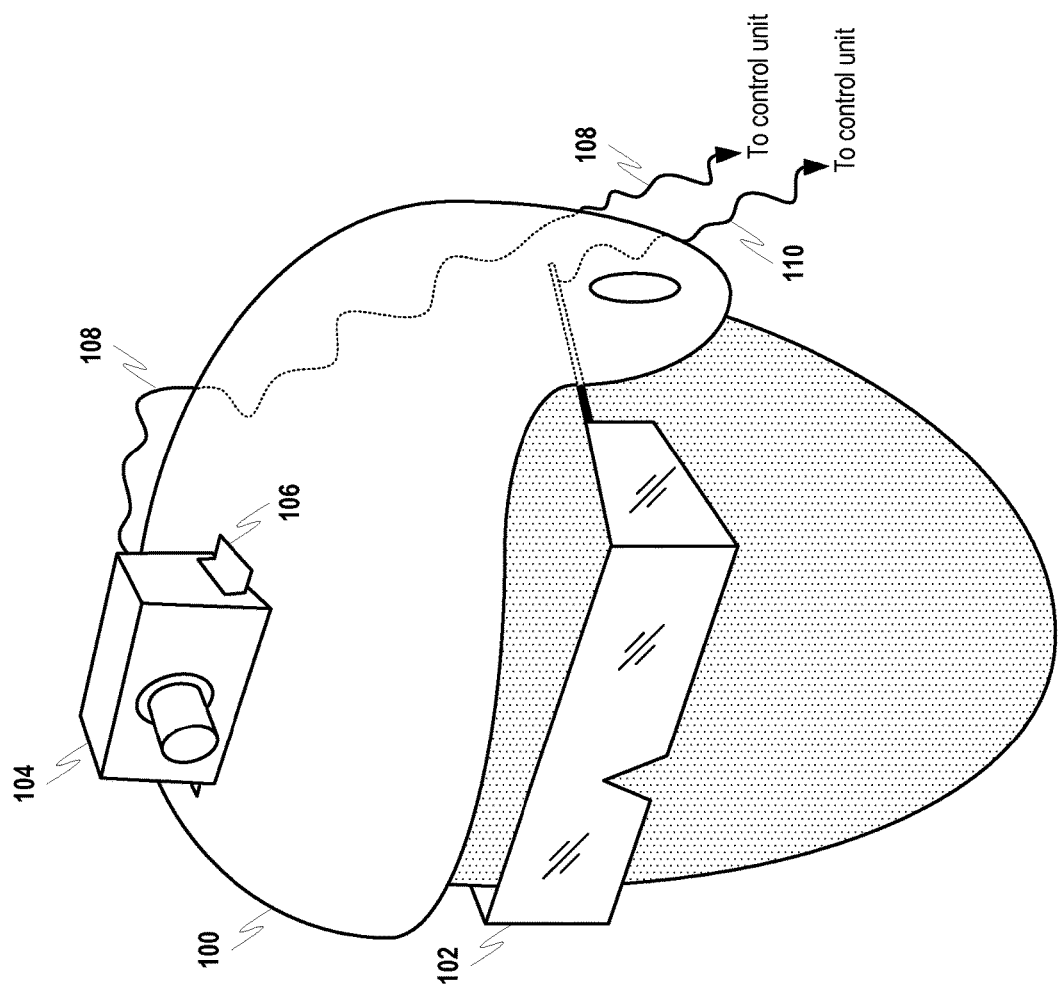
FIG. 1 discloses an example camera apparatus affixed to a helmet that may be utilized when implementing the various embodiments of the present disclosure.

At least one example implementation of the present disclosure may employ a camera apparatus that is permanently or removably affixed to a helmet. An example of such an implementation is disclosed in FIG. 1. Helmets, such as disclosed at 100, may be applicable to various security and/or safety related pursuits such as military, law enforcement, firefighting, search and rescue, border patrol, etc. In the example of FIG. 1 helmet 100 comprise camera apparatus 104, which is affixed to helmet 104 via one or more fixed or detachable mounts 106. Camera apparatus 104 may be a video camera, thermal camera, infrared camera or other type of camera depending on the situation in which the vision system is being applied. Mounts 106 may affix camera apparatus 104 to helmet 100 in a permanent or removable manner, and may include features for adjusting the position, direction, focus area, etc. of the camera. For example, camera apparatus 104 may mounted in various positions on helmet 100 such as the top, front, front lip side, etc., and may be removed for replacement with another type of camera, a new camera (e.g., in the instance that camera apparatus 104 is broken or obsolete) or for temporary mounting to another surface (e.g., the roof of a vehicle, an extension pole, a weapon rail mount system, etc.).

Camera apparatus 104 may be coupled to a wearable control unit via cable 108. In accordance with at least one example implementation, wire 108 may be integrated in (e.g., run through) helmet 100 in order to prevent the wire from being severed or disconnected. It may also be possible for camera apparatus 104 to interact with the wearable control unit via wireless communication. Short-range wireless communication mediums like Bluetooth were originally designed to replace wired connections, and may be employed over short distances to connect apparatuses. The particular choice of wired vs. wireless communication may depend on factors such as the requirement to operate in areas of high electronic interference, the criticality of the communication, the amount of information to be conveyed, the required connection speed, etc. Example eyewear 102 is also disclosed in FIG. 1. As will be discussed later in this disclosure, various embodiments may integrate the wearable vision system and/or a communication subsystem into eyewear such as disclosed at 102. In view of this configuration, wire 110 may couple the electronics incorporated into eyewear 102 to a wearable control unit. Again, depending on the application this connection may also be wireless as described above. In at least one example implementation, camera apparatus 104 may further comprise a covering or cladding to render camera apparatus 104 water-resistant or waterproof and/or to suppress electronic and/or thermal emission, reflection, etc from camera apparatus 104. This covering may help to protect a user (e.g., wearer) from being discovered by other location/vision systems and/or hostile parties.

Figure 2:
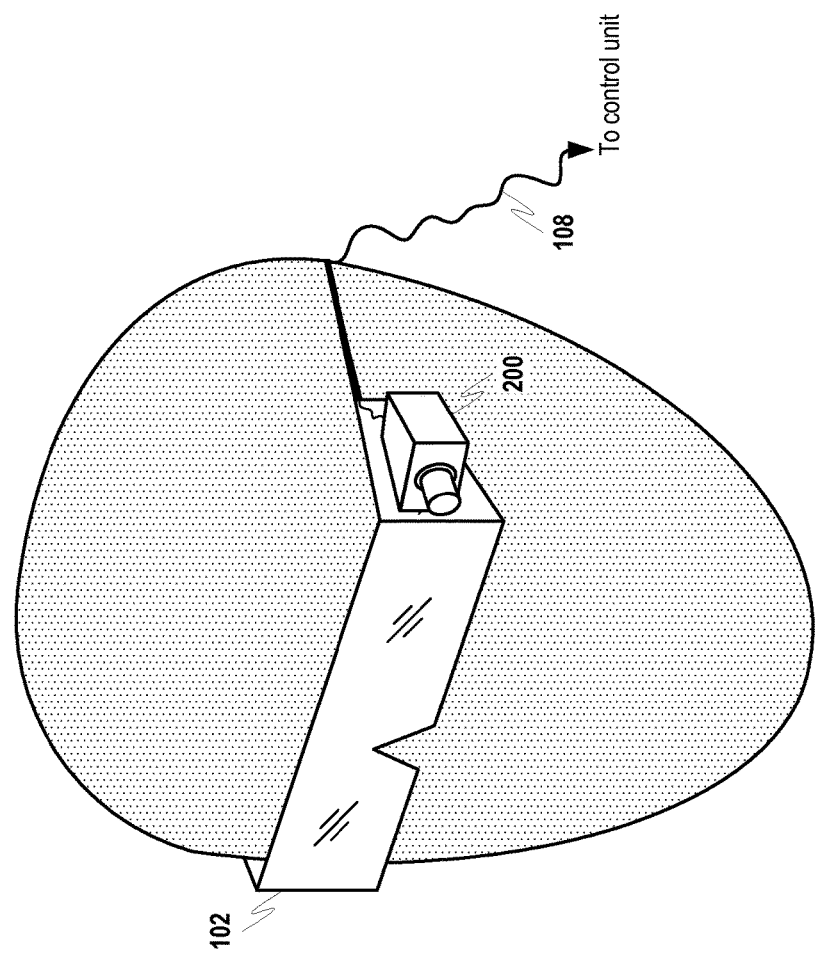
FIG. 2 discloses an example camera apparatus affixed to eyewear that may be utilized when implementing the various embodiments of the present disclosure.

An alternative configuration wherein camera apparatus 200 is affixed to eyewear 102 is disclosed in FIG. 2. The configuration disclosed in FIG. 2 may be employed in situations where, for example, the user may not be wearing a helmet. Further to being affixed to eyewear 102, camera apparatus 200 may be also be electronically coupled to eyewear 102 via a physical electronic connection (e.g., a wire as shown in FIG. 2), and thus, may subsequently be linked to a wearable control unit via wire 108. In some configurations it may also be possible for the communication link between camera apparatus 200 and the wearable control unit to be wireless.

Figure 3:
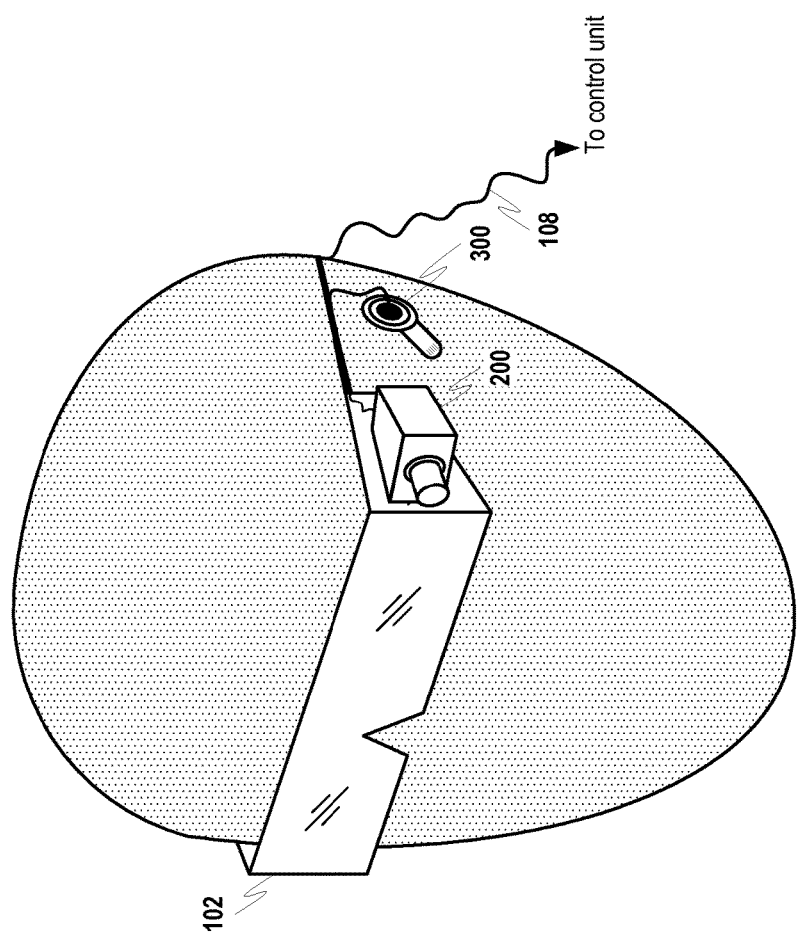
FIG. 3 discloses an example camera apparatus affixed to eyewear, wherein the eyewear further comprises a communication subsystem, that may be utilized when implementing the various embodiments of the present disclosure.

FIG. 3 discloses the example configuration shown in FIG. 2 with the addition of communication subsystem 300 being integrated into eyewear 102. In accordance with at least one embodiment of the present disclosure, subsystem 300 may be physically and electronically coupled to eyewear 102, and may comprise an audio input and output (e.g., a microphone and an earpiece). The example communication subsystem 300 is shown in FIG. 3 with a earpiece and boom-type microphone, but other configurations are possible. Subsystem 300 may allow a user (e.g., wearer) to communicate with other team members, a home base, etc. Some or all of the electronics needed to support subsystem 300, such as a radio transceiver and any other hardware and/or software needed for wireless communication, may be incorporated into a wearable control unit to which subsystem 300 is connected by wire 108. In an alternative configuration, it is also possible for subsystem 300 to be self-contained (e.g., not physically or electronically linked to eyewear 102), wherein the connection between subsystem 300 and the wearable control unit may be through a separate wire or wireless. Moreover, the wearable control unit may comprise a user interface for controlling various aspects of subsystem 300 such as channel, volume, muting, etc.

Figure 4:
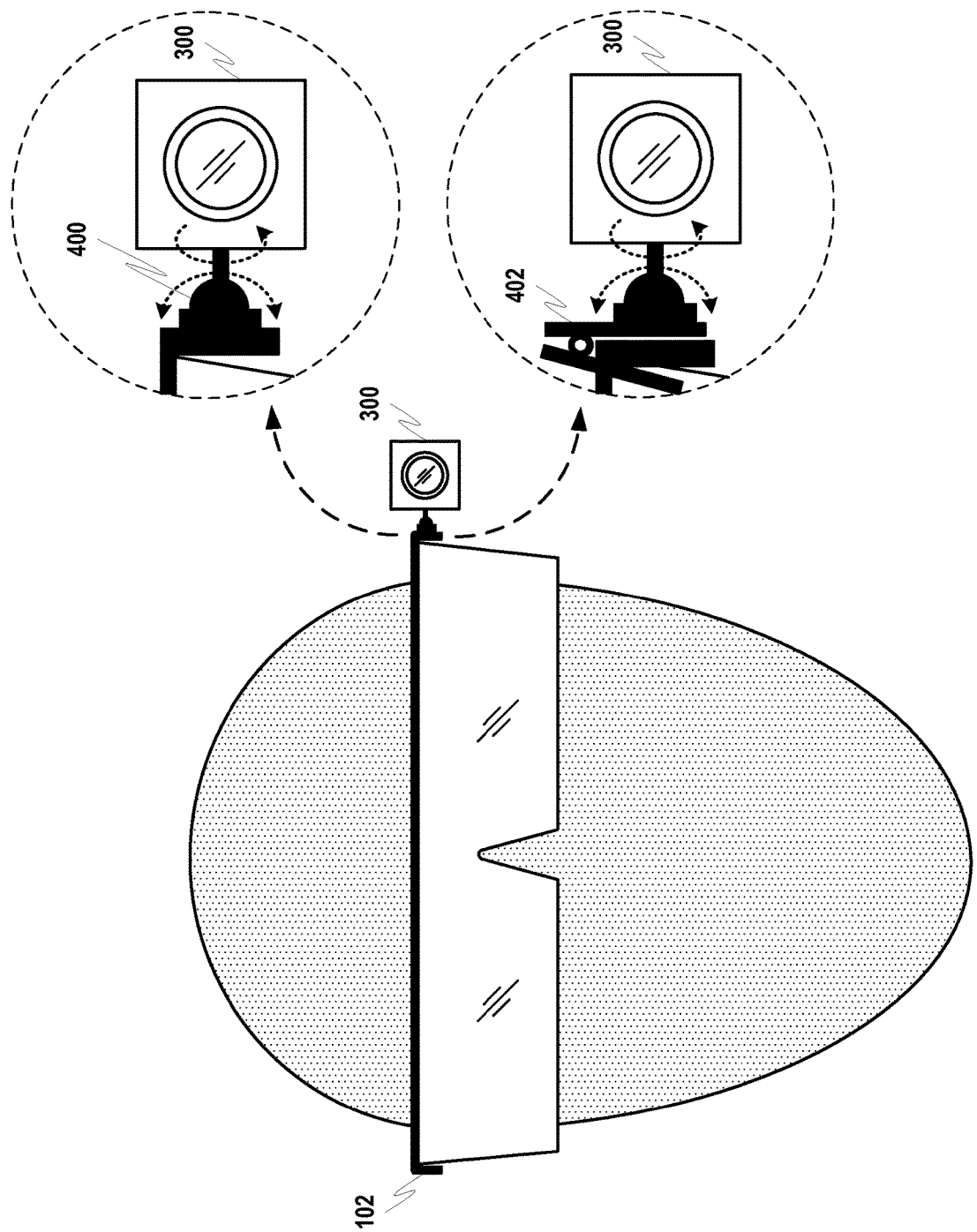
FIG. 4 discloses example camera apparatus attachments in accordance with at least one embodiment of the present disclosure.

Camera unit 400 may be affixed to helmet 100 or eyewear 102 in a permanent or configuration. Examples of both a permanent and removable coupling are disclosed in FIG. 4. FIG. 4 discloses a view looking into the front of eyewear 102, wherein camera apparatus 300 is affixed to the side (e.g., the temple area) of eyewear 102. In a first implementation, attachment 400 may permanently affix camera apparatus 300 to eyewear 102. Attachment 400 may include one or more joints that allow the relative position of camera apparatus 300 to be altered with respect to eyewear 102. For example, joints may allow the camera to tilt higher or lower, or to rotate axially with respect to attachment 400. Such movement may allow camera apparatus 300 to be positioning away from headgear (e.g., a hat or helmet) or to provide views from different perspectives. Camera apparatus 300 may also be affixed in a removable manner such as shown at 402. Removable attachment 402 is disclosed as a clip that may attach camera apparatus 300 to the frame of eyewear 102, but it is not limited to only the disclosed configuration. For example, other attachment methods may comprise fabric attachments like Velcro, screws, mechanical interconnects, etc. The ability to detach camera apparatus 300 from eyewear 102 or helmet 100 may allow camera apparatus 300 to be mounted in locations that might otherwise be dangerous to a vision system user. For example, camera apparatus 300 may be removed from eyewear 102 or helmet 100 and mounted on an extension pole in order to provide vision over a structure (e.g., a wall), around a corner, etc. Camera apparatus 300 may also be attached to the roof of a vehicle so that vision outside the vehicle may be provided to a user that remains safe within the vehicle. Other possible mounting configurations may include, but are not limited to, on other parts of a user's (e.g., wearer's) apparel such as a hat, shirt, coat, suspender, etc., on a backpack or other type of worn bag, on an extension wand, on rescue or other job-related tools, on weapons, etc.

Figure 5:
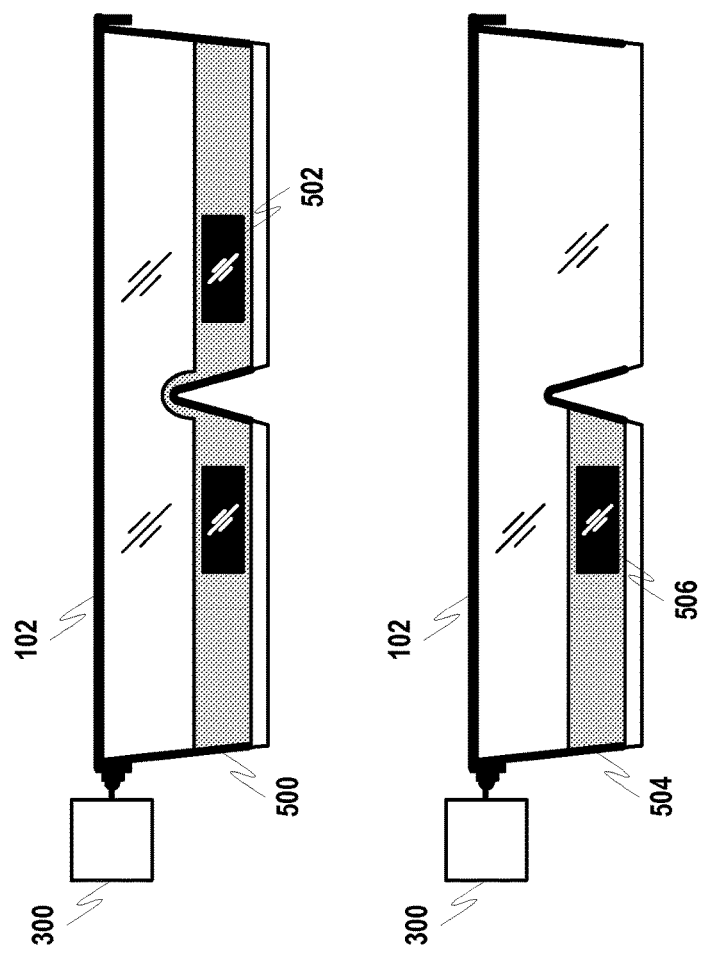
FIG. 5 discloses example wearable vision apparatus configurations in accordance with at least one embodiment of the present disclosure.

In accordance with at least one embodiment of the present disclosure, example wearable vision apparatuses are disclosed in FIG. 5. Example wearable vision apparatus 500 comprises a binocular video display, while example wearable vision apparatus 504 comprises a monocular video display. In wearable vision apparatus 500, camera information processed by a wearable control unit may be processed into video information that may be displayed to the left and right eyes of a user (e.g., wearer) via two display windows 502. The display windows may be focused so that while the image is very close to the user's eyes, the image appears to be some distance away, such as equivalent to the image displayed by a large screen television displace at some distance from the user. The disposition of wearable vision apparatus 500 in the lower half of the lens area of eyewear 102 allows users to view their surroundings by looking through the lens of eyewear 102 or to view video information displayed by wearable vision apparatus 500 without having to physically reconfigure eyewear 102. Instead, a user need only briefly shift eye focus between the forward field of view and video displays 502, allowing for quick acclimation and shorter interruptions in attention. In the alternative wearable vision apparatus disclosed at 504, a monocular configuration is shown that may display video information to the right eye or left eye of a user via display window 504. Alternative configuration 504 may be employed in situations where, for example, the user of a monocular vision apparatus (e.g. a "patrol" version) does not rely on the information provided by the vision system as heavily as a user of a binocular vision apparatus (e.g., a "tactical" version), and thus, does not need the expanded display image that is provided by the binocular system version. Monocular wearable vision apparatus 504 may also be reconfigurable for use with either the right or left eye of the user.

Regardless of whether the configuration disclosed at 502 or 504 is implemented, the wearable vision systems disclosed in FIG. 5 may display visual information to a user such as video information derived from camera capture information and indicator information related to system status (e.g., activation state, sensing mode, battery life, etc.), system malfunctions, etc.

Figure 6:
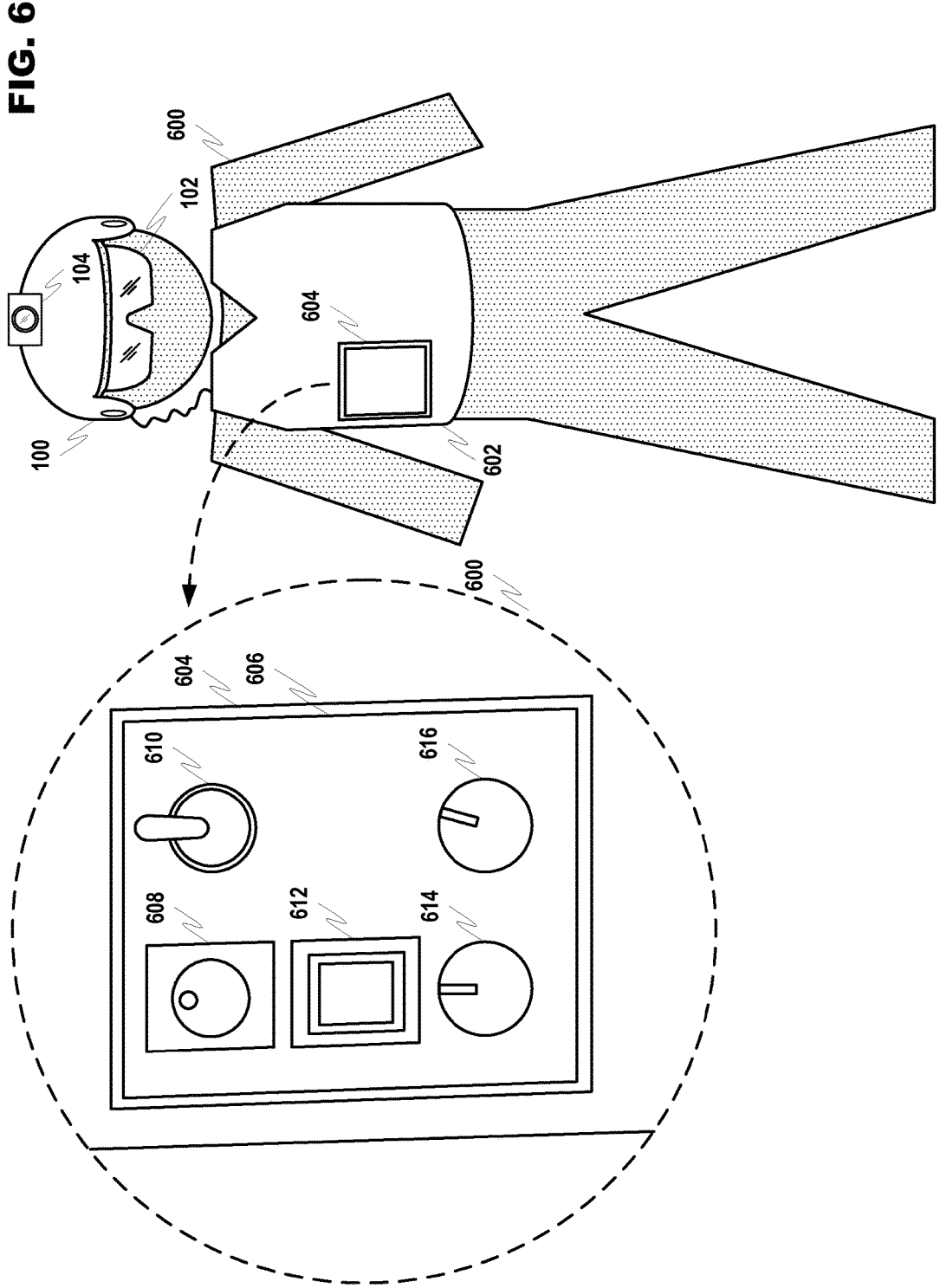
FIG. 6 discloses an example user interface configuration in accordance with at least one embodiment of the present disclosure.
Figure 7:
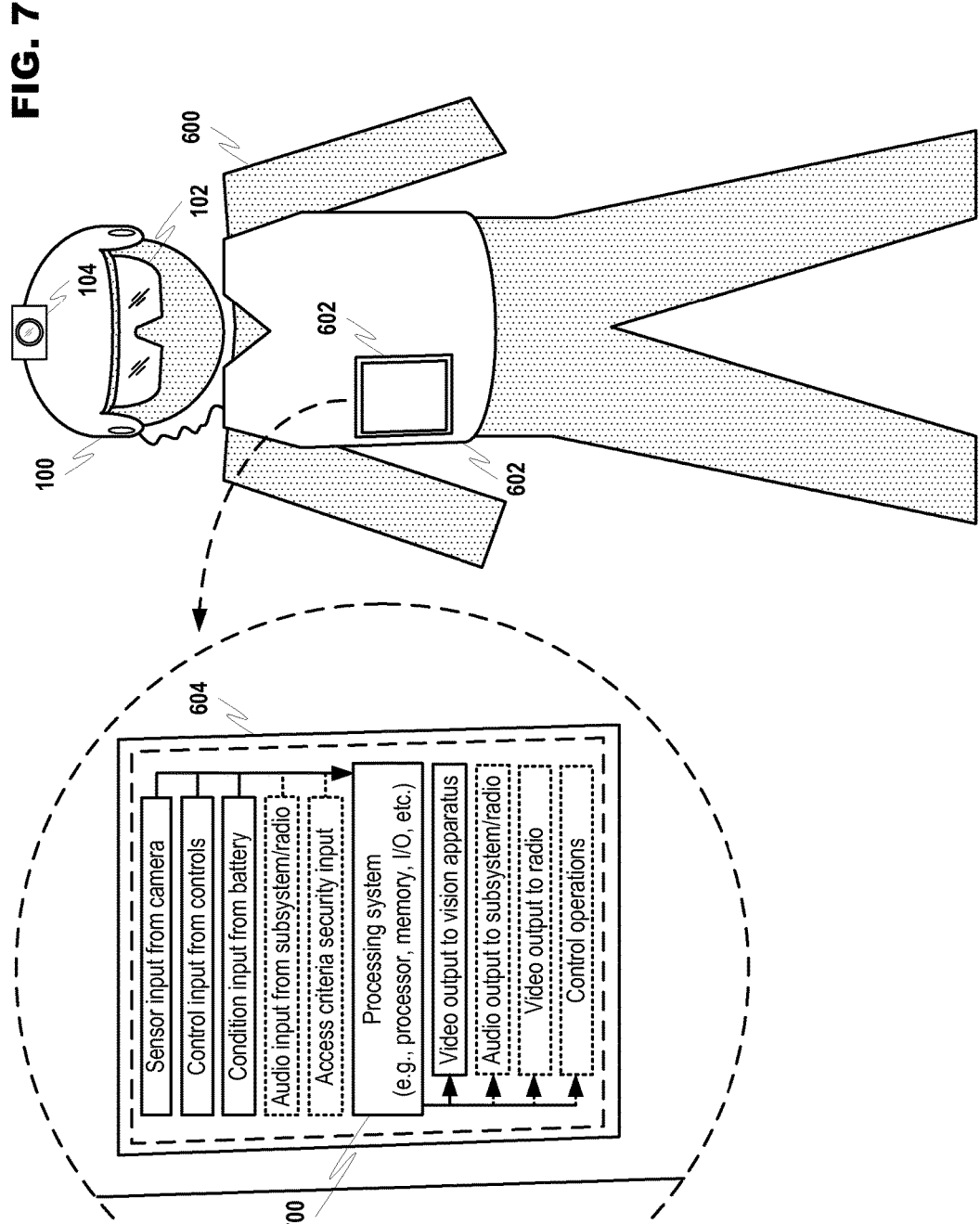
FIG. 7 discloses an example wearable control unit processing configuration in accordance with at least one embodiment of the present disclosure.

Processing and control elements of a vision system implemented in accordance with at least one embodiment are disclosed in FIGS. 6 and 7. Initially, a rudimentary user 600 is disclosed wearing helmet 100, eyewear 102 and camera apparatus 104 as previous described in FIG. 1. This particular configuration has been pictured merely for the sake of explanation, and is not intended to limit the scope of the disclosed embodiments in that it would also be possible to utilize the implementation disclosed in FIG. 2 in FIGS. 6 and 7.

User 600 is wearing vest 602. Vest 602 may simply be an article of clothing such as a tactical vest (e.g., with pockets for storing important articles), or may be protective in nature such as with bullet-proof vests or flak jackets. In at least one implementation, wearable control unit 604 may be integrated into vest 602. When integrated into vest 602, wearable control unit 604 may be positioned so that users (e.g., wearers) may access user interface 606 without having to set aside handheld items or to avert their attention from a situation. Example user interface 606 is shown as comprising various controls such as rocker switches 608, toggle switches 610, pushbuttons 612 and knobs 614 and 616. In accordance with at least one embodiment of the present disclosure, the choice of controls and/or the location of the controls in user interface 606 may be selected to allow a user with a gloved hand to still easily manipulate controls 608-616. The functionality orchestrated by the controls may depend on the implementation of the vision system. Example features that may be controlled by user interface 606 include activation of camera apparatus 104, the sensitivity of camera apparatus 104, the display characteristics of wearable vision apparatus 500 or 504 such as contrast, brightness, toggle black-on-white or white-on-black background for thermal systems, etc. In addition, if communication subsystem 300 is incorporated into the vision system, then some controls in user interface 606 may also control communication functionality such as radio channel, earpiece volume, muting, etc.

FIG. 7 discloses an example of processing operations that may be supported by wearable control unit 604. Some or all of the operations shown in FIG. 7 may occur in wearable control unit 604, and may be executed by processing system 700. Processing system 700 may comprise a communication bus system linking processing, memory and input/output (I/O). For example, processing may include one or more general purpose processors and/or dedicated processors (e.g., video coprocessors). Memory may comprise various types of media such as magnetic (e.g., hard drives, floppy disks, etc.), electronic (e.g., electronic programmable read-only memories or EPROM, Flash, etc.) or optical (e.g., compact disc read only memories or CD-ROM, CD-R, CD-RW, etc.) that are configured as either dynamic memory (e.g., random-access memory or RAM) or static memory (e.g., read-only memory or ROM). These memories may be removable in that some formats (e.g., Flash drives) may be easily removed from the system for use in transferring data. I/O may comprise any components related to receiving and transmitting information, and may therefore include hardware and/or software resources for receiving sensor input (e.g., thermal or infrared information) from camera apparatus 104, control input (e.g., the control settings) from user interface 606, condition information (e.g., current power level) from the battery and optionally audio input (e.g., if the system includes a communication subsystem) from communications subsystem 300, as well as incoming radio signals. In at least one example implementation, inputting security access criteria may also be required prior to system activation.

Processing, memory, I/O, etc. may be implemented as individual components or in a single chip solution that incorporates some or all of these features. For example, integrated circuit technologies similar to those currently being implemented in "smart phones" may be used in order to leverage upon their small footprint and built-in power conservation characteristics. In at least one embodiment, security access criteria may be required before other functionality is enabled in wearable control unit 604. Security access criteria may comprise a multi-tier system that requires information such as fingerprint, retina scan, voice identification, code entry, etc. Once all of the required security information has been supplied wearable control unit 604 may activate. It is also possible that various secure modes may exist, allowing some functionality to be active so that technicians may service the vision system without actually being able to utilize all of the features. Moreover, failing to provide all of the required security access criteria may cause one or more components of the vision system to self-destruct (e.g., to become disabled to a point where they can no longer be used or even serviced). A similar result may occur if any of the components of the vision system are intruded upon, tampered with, modified or stolen, which may be automatically detected by the processor upon start-up (e.g., implemented as part of a power-up procedure). Security safeguards such as set forth above may help to prevent the unit from being used against the original user should it come into the possession of hostile opposition.

After incoming information is processed, the I/O may further transmit the results of the processing. Processing may range from changing incoming signals into another format, such as converting sensed thermal or infrared in visual images expressed as video information to simply conveying information to a desired destination (e.g., audio and/or video information) and various other data manipulation operations in-between. The actual processing performed within wearable control unit 604 may vary depending on, for example, the processing abilities of the other vision system components. For example, camera apparatus 104 may be capable of performing some or all of any processing that is needed in order to output video information in a format that is displayable directly on wearable vision apparatus 500 or 504. In such instances "processing" may involve formatting the camera information in accordance with the control information input from user interface 606, or may simply comprise passing the information through wearable control unit 604 without any alteration. I/O resources may then again be utilized when transmitting output video information to wearable vision apparatus 500 or 504 for display. Optionally audio information may be output to communication subsystem 300 or a radio for wireless transmission, and video information may also be output to a radio for transmission if, for example, events involving the user of the vision system are being tracked and/or recorded at a remote location. In addition to core display functions, other outputs may comprise control operations such as power use, flow and management commands or indicators, electromechanical commands (e.g., if camera 104 is affixed to a motorized mount), "heads-up" display information comprising indicators for system condition, location (e.g., global positioning system, or GPS, coordinates), etc. that are displayable in wearable vision apparatus 500 or 504.

Figure 8:
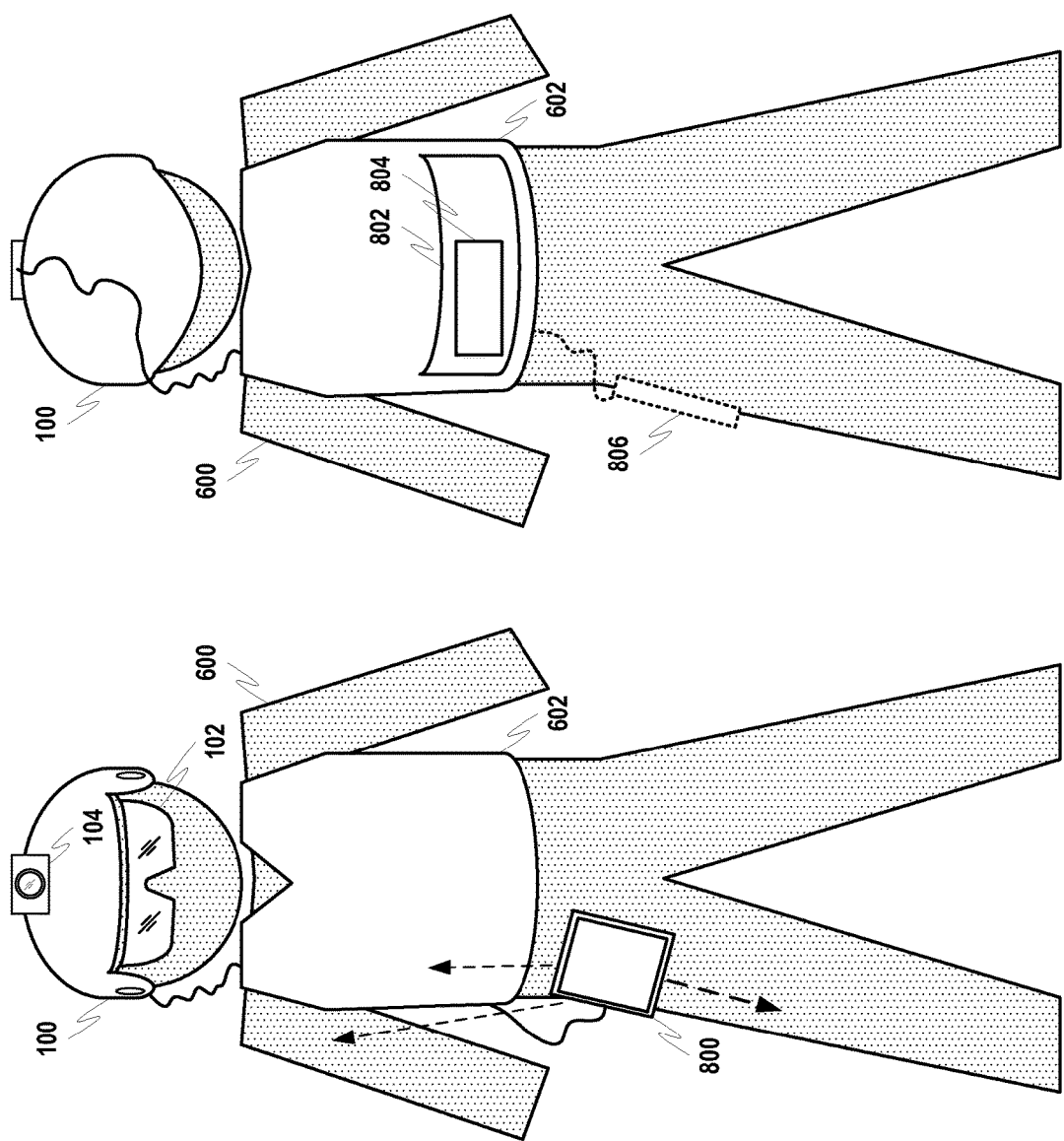
FIG. 8 discloses example wearable control unit and battery configurations in accordance with at least one embodiment of the present disclosure.

Alternative configurations for a wearable control unit are disclosed in FIG. 8. For example, wearable control unit 800 may not be integrated into vest 602, but may instead by self-contained (e.g., modular) so that it may be affixed to a user (e.g., wearer) at various points. The example of FIG. 8 discloses possible mounting points such as on the chest, shoulder, belt clip, pocket or hip of the user. The manner in which wearable control unit 800 is affixed to a user may depend in the desired location of mounting (e.g., the amount of motion or a desired alignment may determine the type of mount). Regardless of the implementation (e.g., whether integrated into vest 602 or as a separate mountable module) wearable control unit 800 may be constructed using materials that render both its internal electronics and user interface 604 water-resistant or waterproof. These materials may further suppress thermal/electronic emission and/or reflection in order to avoid detection by other location/vision equipment and/or hostile parties.

A rear view of user 600 is also disclosed in FIG. 8, wherein possible battery placements are described for powering the vision system. A particular type of battery may be selected for powering the vision system based on various physical and electrical characteristics such size, charge capacity, recharge time, etc. The manner in which the battery is integrated into the vision system may depend on additional characteristics of the battery such as durability (e.g., sensitivity to rough handling, temperature, etc.). In at least one example implementation, battery retention compartment 802 may be configured within vest 602 to retain battery 804 during use. Battery retention compartment 802 may be configured to hold battery 804 securely during activity, but to still allow be removal, possibly in the field, for replacement or recharging. In at least one example configuration, battery retention compartment 802 may comprise padding that not only cushions battery 804 from impact, but that also insulates against cold temperatures that may cause battery 804 to discharge more quickly. It may also be possible for the padding, or other materials used in battery retention compartment 802, to provide water-resistance or waterproofing and/or to suppress any electronic/thermal emission and/or reflection that may be detectable by hostile vision/location equipment. Battery retention compartment 802 may also be disposed in a separate battery power pack electronically coupled to wearable control unit 800 (e.g., by a power wire) and located (e.g., worn) anywhere on the person of a user (e.g., wearer) such as externally strapped or clipped on the back of the vest, chest, shoulder, belt clip, pocket, hip, etc. Wearable control unit 800 may also comprise a compartment for retaining battery 804 as further shown at 806, however, this implementation may depend on the size of the battery.

Figure 9:
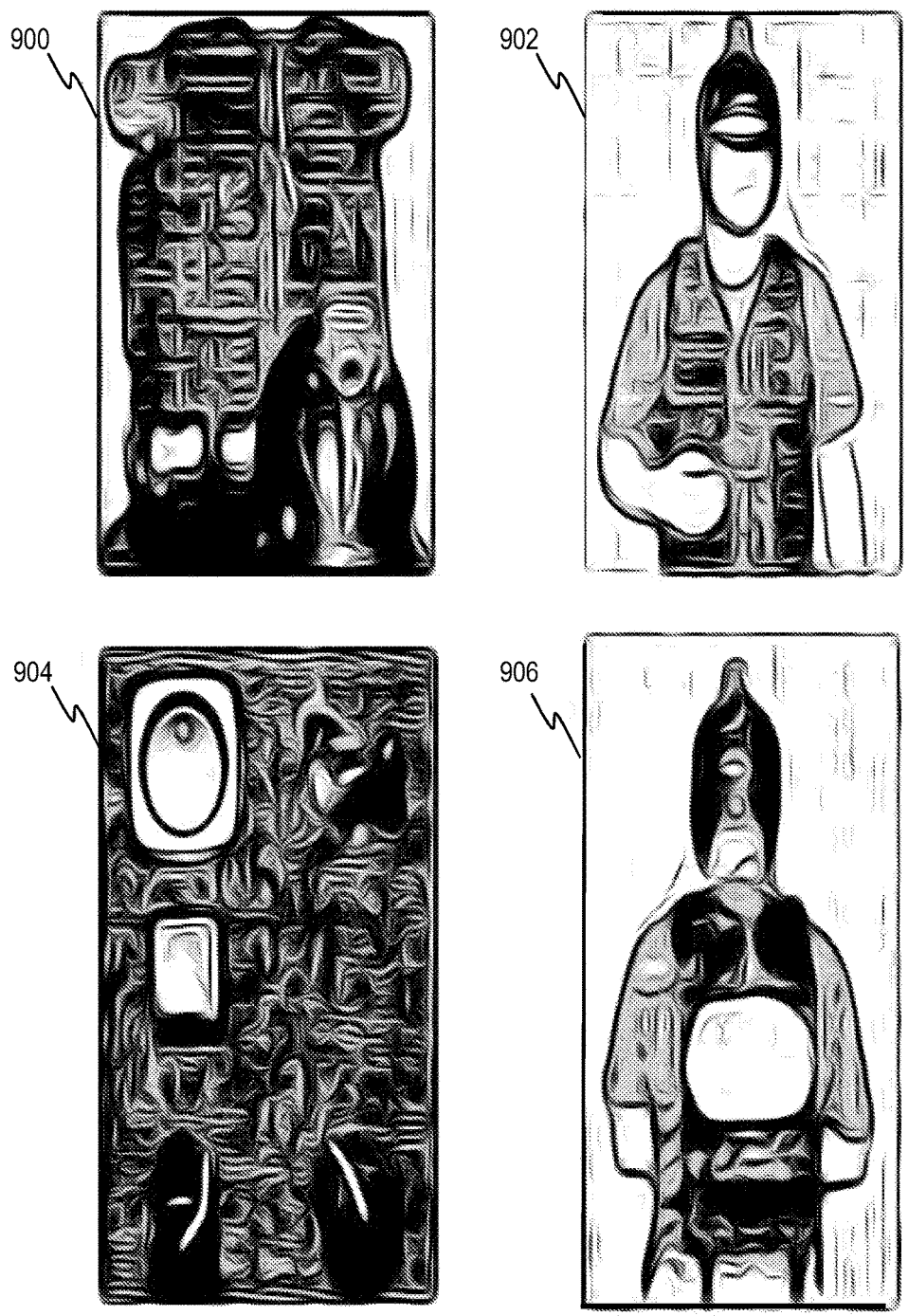
FIG. 9 discloses example implementations of the present disclosure wherein the camera apparatus is affixed to a helmet and the battery is configured to be separate from the wearable control unit in accordance with at least one embodiment.

In accordance with at least one example implementation, FIG. 9 discloses photographs of an actual "mock-up" of a vision system. An integration of a camera apparatus into a helmet and a wearable control unit into a vest is shown at 900. A person wearing the helmet, vest and a wearable vision apparatus is shown at 902. A possible control panel configuration is disclosed at 904, and a rear view of the person shown at 902 is disclosed at 906, wherein a separate compartment containing a battery is disclosed affixed to the back of the vest. The configuration disclosed in FIG. 9 demonstrates that various changes may be made when implementing a vision system in accordance with the various disclosed embodiments. For example, it may be advantageous if the lens portion of the eyewear was interchangeable so that different lens may be installed (e.g., prescription lenses, hyper distance lenses, etc.). Further, employing a lens material that is photochromic or "transitional" may make the system applicable to more diverse situations. Anti-fog properties may also make the eyewear more appropriate for use in diverse applications. The wearable vision apparatus may be set in a fixed position within eyewear or may be gimbaled to accommodate various user facial characteristics. The design of the eyewear/wearable vision apparatus may allow for the attachment of an available camera apparatus, like a DRS UC-320-17 camera, or another similar camera apparatus. A single viewer cable may attach the viewer to the wearable control unit, which may house electronics that may be powered by a rechargeable Lithium Polymer (LiPO) battery, a Lithium Ion (LiON) battery or an external power source. The battery system may also comprise an externally connectable battery option, possibly with a quick connect to the vest, that accepts available rechargeable battery types (e.g., size AA, AAA, etc.).

In order to help ensure survivability in the field, vision systems implemented in accordance with the various embodiments of the present disclosure may be tested for compliance with the MIL-STD-810G drop test from 36", the MIL-STD-810G Sand-Dust test or the IP67/68 water, sand/dust test. Moreover, EMC EN 61000-6-2: 2001 Part 6-2 Generic Standard Immunity for Industrial Environments and FCC/CE compliance tests may be run, if required. Example vision systems may also be designed to operate in a temperature range between −40 c to +65 c.

The power source for vision system designed in accordance with the various embodiments of the present disclosure may include a power source specified for eight (8) hours of continuous use under normal conditions (e.g., average usage, mid-range temperatures, etc.), quick recharge characteristics and the optional use of an external battery. An example maximum voltage level for the camera (without analog video out) may be 5.5 vdc. All connectors may be military standard (MIL-STD), quick disconnect. The color of the system components may be, for example, non-reflective black or standard camouflage.

A wearable vision apparatus, in accordance with at least one embodiment, may have quarter video graphics area VGA (QVGA) at a minimum in view of available camera technology, and may be upgraded as higher resolution camera apparatuses become available. Field of View (FOV) may be optimized based on the video processing technology (e.g., camera, display chip, etc.) that is employed and may be, for example, −40, −27, −15. −9 in view of current camera technology. The weight of the vision system components should be as light as possible to allow effective and unimpeded use in the filed. For example, the total weight of the eyewear, including the wearable vision apparatus, may be about 37 grams (OEAX configuration). The eyewear may further be of durable and/or flexible construction to allow, for example, form fitting temples. If the system components are coupled by wired connections, the wires utilized to couple the system components may be high strength cables, possibly constructed using a durable waterproof product like Goretex™. The cable coupling the eyewear, and the wearable vision apparatus, to the wearable control unit may be a single cable secured so it exits towards the back of the user's head. A secure fit, possibly through a configuration similar to a sunglass "Croakie" or a behind the head band may be used to secure the eyewear during anticipated active usage. In the instance that a single cable is utilized to couple the camera apparatus and the wearable vision apparatus to the wearable control unit, electronic sockets (e.g., possibly MIL-STD lockable and/or watertight sockets) may be utilized to electronically couple the components to the cable.

In accordance with at least one example implementation, the wearable control unit may contain no external lighting (e.g., no external indicator light emitting diodes or LEDs). The controls of the wearable control unit may be manipulated while wearing gloves and may comprise power buttons, viewer "dim" buttons so viewer may be deactivated while camera remains active, zoom in/out controls for the camera apparatus, white/black hot selection buttons for thermal imaging and contrast and brightness controls for the wearable vision apparatus. Other controls for the wearable control unit may comprise a communications push-to-talk (PTT) button and a video record button for an on-board or remotely-located digital video recorder.

Figure 10:
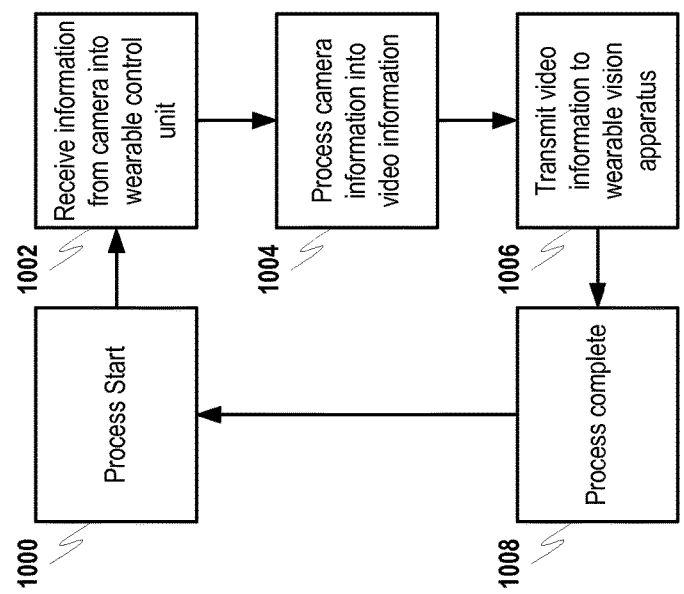
FIG. 10 discloses a flowchart of an example process in accordance with at least one embodiment of the present disclosure.

A flowchart of an example process, in accordance with at least one embodiment, is disclosed in FIG. 10. The process may initiate in step 1000. An apparatus (e.g., a wearable control unit) may then receive information from a camera apparatus in step 1002. The camera information that is received by the wearable control unit may be, for example, thermal or infrared information captured by the camera apparatus. In step 1004 the wearable control unit may then process the camera information, such as previously described, in order to yield video information. The video information may then be transferred to another apparatus (e.g., a wearable vision apparatus) in step 1006. In accordance with at least one embodiment, the information transmitted to the wearable vision apparatus may then be displayed (e.g., to a user of the vision system). The process may then be complete in step 1008 and may return to step 1000 to reinitiate the process (e.g., so that the wearable control unit may receive, process and transmit additional information).

The various embodiments of the present disclosure are not limited only to the examples disclosed above, and may encompass other configurations or implementations.

For example, embodiments of the present disclosure may encompass a wearable control unit comprising means for receiving camera information from a camera apparatus, means for processing the received camera information in the wearable control unit to create video information, and means for transmitting the video information to a wearable vision apparatus configured to display the video information.

At least one other example embodiment of the present disclosure may include electronic signals that cause a wearable control unit to receive camera information from a camera apparatus, processing the received camera information in the wearable control unit to create video information, and transmitting the video information to a wearable vision apparatus configured to display the video information.

Accordingly, it will be apparent to persons skilled in the relevant art that various changes in form and detail can be made therein without departing from the spirit and scope of the disclosure. The breadth and scope of the present disclosure should not be limited by any of the above-described example embodiments, but should be defined only in accordance with the following claims and their equivalents.

What is claimed:

1. A system, comprising:
a wearable control unit configured to at least receive camera information, to process the received camera information and to output video information, the wearable control unit including a user interface having user controls to configure at least one of the camera apparatus and the wearable vision apparatus;
a camera apparatus configured to interact with the wearable control unit by providing camera information to the control unit; and
a wearable vision apparatus configured to interact with the wearable control unit by receiving and displaying the video information; and
a vest comprising one of a tactical vest or a bullet-proof vest,
wherein the wearable control unit is integrated inside of the vest with the user controls arranged on an outside of the vest.

2. The system of claim 1, wherein the wearable control unit interacts with at least one of the camera apparatus and the wearable vision apparatus via wired connections.

3. The system of claim 1, wherein the wearable control unit interacts with at least one of the camera apparatus and the wearable vision apparatus via short-range wireless connections.

4. The system of claim 1, wherein the user interface provides access to control one or more of activation of the camera apparatus, sensitivity of the camera apparatus and how the processed image information is displayed by the wearable vision apparatus.

5. The system of claim 1, wherein the control unit further comprises a removable battery.

6. The system of claim 1, wherein the camera apparatus is mounted on eyewear or on a helmet.

7. The system of claim 6, wherein the camera apparatus is detachable from the eyewear or the helmet.

8. The system of claim 1, wherein the camera information is at least one of thermal information or infrared information.

9. The system of claim 8, wherein the control unit process processes the at least one of thermal information or infrared information to yield video information.

10. The system of claim 1, wherein the wearable vision apparatus comprises a binocular video display configured to display the video information to a user's left and right eyes.

11. The system of claim 1, wherein the wearable vision apparatus comprises a monocular video display configured to display the video information to a user's left or right eye.

12. The system of claim 1, wherein the wearable vision apparatus is incorporated in eyewear, the eyewear being configured to allow a user to see through the eyewear or to view video information displayed by the wearable vision apparatus without adjusting the eyewear.

13. The system of claim 12, wherein the eyewear further comprises a communication subsystem including at least a microphone and earpiece.

14. The system of claim 13, wherein the communication subsystem is configured to interact with the wearable control unit via a wired connection or short-range wireless connection, the communication subsystem being controlled by the user interface in the wearable control unit.

15. The system of claim 12, wherein the eyewear is tactical eyewear.

16. The system of claim 1, further comprising a battery that is electrically connectable to the wearable control unit to power the wearable control unit, the battery and the wearable control unit arranged in separate compartments of the vest.

17. The system of claim 16, wherein the wearable control unit is in a front of the vest and the battery is in a rear of the vest, and the separate compartment with the battery is configured to suppress any electronic or thermal emission of the battery thereby preventing detection thereof.

18. The system of claim 1, wherein the wearable control unit is substantially covered within the vest except for the user controls.

19. The system of claim 1, wherein the wearable control unit is connected to the camera apparatus by one or more cables, which extend from the camera apparatus into the vest for connection to the wearable control unit.

20. The system of claim 1, wherein the wearable control unit is substantially covered within the vest except for the user controls which protrude through the vest to allow operation by a user.

* * * * *